(12) United States Patent  (10) Patent No.: US 8,751,112 B2
Kim  (45) Date of Patent: Jun. 10, 2014

(54) DANGER SENSING APPARATUS OF VEHICLE AND CONTROL METHOD THEREOF

(75) Inventor: Moo Seop Kim, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 43 days.

(21) Appl. No.: 13/495,953

(22) Filed: Jun. 13, 2012

(65) Prior Publication Data

US 2013/0060429 A1    Mar. 7, 2013

(30) Foreign Application Priority Data

Sep. 6, 2011  (KR) .................. 10-2011-0090412

(51) Int. Cl.
  *B60K 28/12*  (2006.01)
  *G05D 3/00*  (2006.01)
  *B60K 28/00*  (2006.01)
(52) U.S. Cl.
  CPC ............. *B60K 28/12* (2013.01); *B60K 28/00* (2013.01); *B60K 21/013* (2013.01)
  USPC ............ 701/45; 701/49; 180/274; 340/425.5
(58) Field of Classification Search
  CPC ........ B60R 1/00; B60R 1/12; B60R 21/0132; B60R 21/013; B60R 21/015; B60R 21/09; B60K 28/00; B60K 28/12; G08B 23/00; E05B 83/36
  USPC .......... 701/44, 45, 48, 49; 180/271, 274, 281, 180/286; 340/425.5, 435, 436, 500, 540, 340/545.1
  See application file for complete search history.

(56) References Cited

U.S. PATENT DOCUMENTS

| 2002/0097146 A1* | 7/2002 | Harris, III ..................... 340/435 |
| 2007/0023224 A1* | 2/2007 | Aoki et al. .................... 180/274 |
| 2007/0223910 A1* | 9/2007 | Aoki et al. .................... 396/301 |
| 2010/0211251 A1* | 8/2010 | Iyoda ............................. 701/29 |

FOREIGN PATENT DOCUMENTS

| JP | 2006-142872 A | 6/2006 |
| KR | 1020050010379 A | 1/2005 |
| KR | 1020050019279 A | 3/2005 |
| KR | 1020080101418 A | 11/2008 |
| KR | 1020100013852 A | 2/2010 |
| KR | 1020100057578 A | 5/2010 |
| KR | 101040324 B1 | 2/2011 |

* cited by examiner

*Primary Examiner* — Mary Cheung

(57) ABSTRACT

A danger sensing apparatus includes a data collecting unit disposed at each of a side rear-view mirror of the vehicle and an inner portion of the vehicle to collect image data of a side region of the vehicle and a situation of a door region of the inner portion of the vehicle as data; a data analyzing unit analyzing the data collected from the data collecting unit to analyze a danger object approaching an outer side of the vehicle and the situation of the door region of the inner portion of the vehicle; and a controlling unit controlling operations of a drive train of the vehicle and the door based on a signal analyzed from the data analyzing unit.

20 Claims, 4 Drawing Sheets

DANGER SENSING APPARATUS OF VEHICLE AND CONTROL METHOD THEREOF

CROSS-REFERENCE TO RELATED APPLICATIONS

This application claims the benefit of priority of Korean Patent Application No. 10-2011-0090412 filed on Sep. 6, 2011, all of which are incorporated by reference in their entirety herein.

BACKGROUND OF THE INVENTION

1. Field of the Invention

The present invention relates to a danger sensing apparatus of a vehicle and a control method thereof, and more particularly, to a danger sensing apparatus of a vehicle capable of reducing danger of passengers getting on/off a vehicle, and a control method thereof.

2. Related Art

A public transportation such as a bus driven on a road, and an educational institute vehicle and a mini-bus on which a plurality of persons get are vulnerable to an accident of passengers when the passengers get on/off them. Therefore, this accident has been frequently generated.

For example, the passengers getting on the vehicle may not recognize a two-wheeled vehicle such as a motorcycle and a bicycle approaching and entering a side of the vehicle when they get off the vehicle after the vehicle stops, and a driver driving the vehicle also has a difficulty in viewing the two-wheeled vehicle with a side rear-view mirror. In addition, the vehicle driver has a difficulty in detecting that the passengers get on/off the vehicle at the time of the stop of the vehicle with the naked eye, such that he/her closes a door or allows the vehicle to start in a situation in which the passengers get on/off the vehicle, thereby making it possible to cause an accident.

Meanwhile, a bus among public transportations according to the related art recognizes a situation in which the passengers get on/off the vehicle using a side rear-view mirror and a reflective mirror installed in a door region. In addition, a wireless image transmitting and receiving apparatus and method for a safety operation of a subway has been disclosed in Korean Patent Laid-Open Publication No. 2005-0010379.

However, since the bus according to the related art simply uses the side rear-view mirror and the reflective mirror installed in the door region, it has a difficulty in informing the passengers of the motorcycle, or the like, approaching a side of the vehicle and does not appropriately recognize the situation in which the passengers get on/off the vehicle when there are a number of passengers in the vehicle. In addition, the wireless image transmitting and receiving apparatus and method for a safety operation of a subway according to the related art may only confirm that the passengers get on/off the vehicle using a monitoring camera installed in a subway station, but may not automatically control a subway door and a drive train according to a danger situation.

RELATED ART DOCUMENT

Patent Document

Korean Patent Laid-Open Publication No. 2005-0010379

SUMMARY OF THE INVENTION

The present invention provides a danger sensing apparatus of a vehicle capable of preventing an accident of passengers by analyzing a side of the vehicle and a situation of a door region of the vehicle at which the passengers get on/off the vehicle, and a control method thereof.

The present invention also provides a danger sensing apparatus of a vehicle capable of informing a driver of a danger situation and actively controlling a function of the vehicle, by automatically analyzing a side of the vehicle and a situation of a door region at which the passengers get on/off the vehicle, and a control method thereof.

In an aspect, a danger sensing apparatus of a vehicle is provided. The damage sensing apparatus includes: a data collecting unit disposed at each of a side rear-view mirror of the vehicle and an inner portion of the vehicle to collect a side region of the vehicle and a situation of a door region of the inner portion of the vehicle as data; a data analyzing unit analyzing the data collected from the data collecting unit to analyze a danger object approaching an outer side of the vehicle and the situation of the door region of the inner portion of the vehicle; and a controlling unit controlling operations of a drive train of the vehicle and the door based on a signal analyzed from the data analyzing unit.

The danger sensing apparatus may further include a data outputting unit outputting an alarm according to a danger situation based on the data collected from the data collecting unit and the data analyzed from the data analyzing unit.

The data outputting unit may include: a display unit displaying an alarm message according to the danger situation based on the data collected from the data collecting unit and the data analyzed from the data analyzing unit; and a sound outputter outputting an alert sound according to the danger situation based on the data analyzed from the data analyzing unit.

The data collecting unit may include: a camera module disposed at the side rear-view mirror and the inner portion of the vehicle to collect the outer side of the vehicle and the situation of the door region of the inner portion of the vehicle as image data; and a data transmitter transmitting the image data collected from the camera module to the data analyzing unit.

The data transmitter may transmit the collected image data to the data analyzing unit in at least one of wired and wireless schemes.

The data analyzing unit may include: a data receiver receiving the data transmitted from the data collecting unit; a danger analyzer analyzing the data received in the data receiver to analyze the danger object approaching the side of the vehicle and the situation of the door region; and a control signal generator generating a control signal based on data analyzed from the danger analyzer.

The danger object may include a motorcycle and a bicycle approaching the outer side of the vehicle.

The danger analyzer may analyze whether or not the danger object is present and a speed at which the danger object approaches the side of the vehicle, in the data received in the data receiver.

The situation of the door region may include a state indicating whether or not a passenger getting on/off the vehicle through the door is present and whether or not an object interposed between an entrance of the vehicle and the door is present.

The danger analyzer may analyze the state indicating whether or not the passenger getting on/off the vehicle through the door is present and whether or not the object interposed between the entrance and the door is present in the image data received in the data receiver.

The controlling unit may control the operations of the drive train of the vehicle and the door based on the control signal generated from the control signal generator in the case in which it is determined that the data analyzed from the danger analyzer corresponds to the danger situation, at the time of stop of the vehicle.

In another aspect, a control method of danger sensing of a vehicle is provided. The control method includes: (a) determining whether the vehicle stops; (b) collecting image data on an outer side of the vehicle and a door region of an inner portion of the vehicle in the case in which it is determined in step (a) that the vehicle stops; (c) analyzing whether or not a danger object approaching the outer side of the vehicle is present and a situation of the door region of the inner portion of the vehicle in the image data collected in step (b) to determine whether a danger situation is generated; and (d) controlling operations of a drive train of the vehicle and the door based on a signal analyzed in step (c).

The control method may further include, between steps (b) and (c), outputting the collected image data.

The control method may further include, between steps (c) and (d), outputting at least any one of an alarm message and an alarm sound in the case in which it is determined in step (c) that the danger situation is generated.

Step (b) may include: photographing the side of the vehicle and the situation of the door region of the inner portion of the vehicle; and transmitting the image data photographed in the photographing.

The transmitting of the image data photographed in the photographing may be performed in at least one of wired and wireless schemes.

Step (c) may include: receiving the image data transmitted in the transmitting; analyzing whether or not the danger object approaching the side of the vehicle is present and the situation of the door region of the inner portion of the vehicle from the received image data to determine whether the danger situation is generated; and generating a control signal in the case in which it is determined than the danger situation is generated.

In the determining of whether the danger situation is generated, whether or not the danger object approaching the side of the vehicle is present and a speed at which the danger object approaches the side of the vehicle may be analyzed, before the door is opened.

In the determining of whether the danger situation is generated, an entrance situation of a passenger getting on/off the vehicle through the door may be analyzed.

In the determining of whether the danger situation is generated, whether or not foreign materials are present between the door and the vehicle may be analyzed, after the door is closed.

DESCRIPTION OF EXEMPLARY EMBODIMENTS

Hereinafter, a danger sensing apparatus of a vehicle and a control method thereof according to an exemplary embodiment of the present invention will be described in detail with reference to the accompanying drawings.

Prior to describing the danger sensing apparatus of the vehicle and the control method thereof according to the exemplary embodiment of the present invention, it is to be appreciated that the danger sensing apparatus of the vehicle and the control method thereof according to the exemplary embodiment of the present invention may be applied to a vehicle on which a plurality of passengers get, such as a bus, an educational institute vehicle, and a mini-bus.

Figure 1:
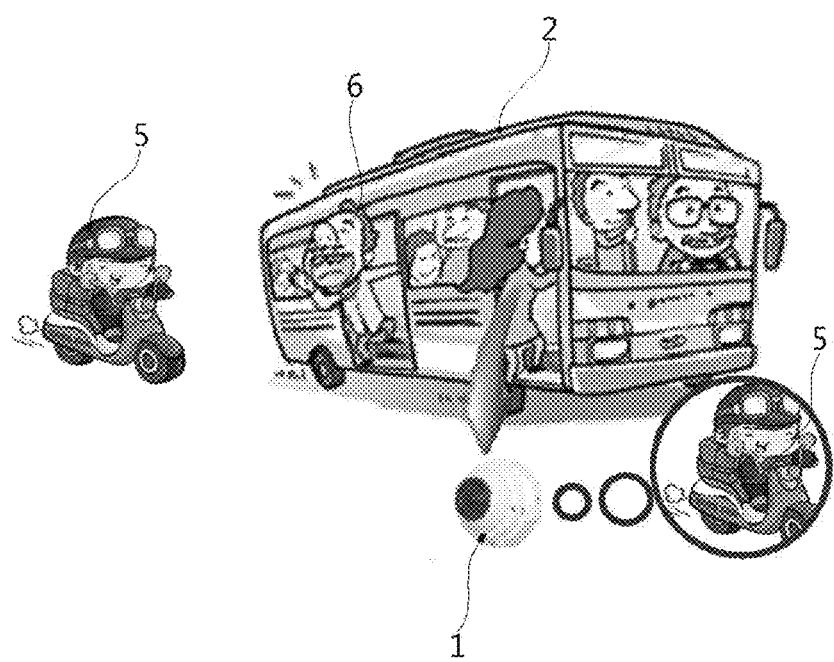
FIG. 1 is a configuration diagram showing an application of a danger sensing apparatus of a vehicle according to an exemplary embodiment of the present invention.
Figure 2:
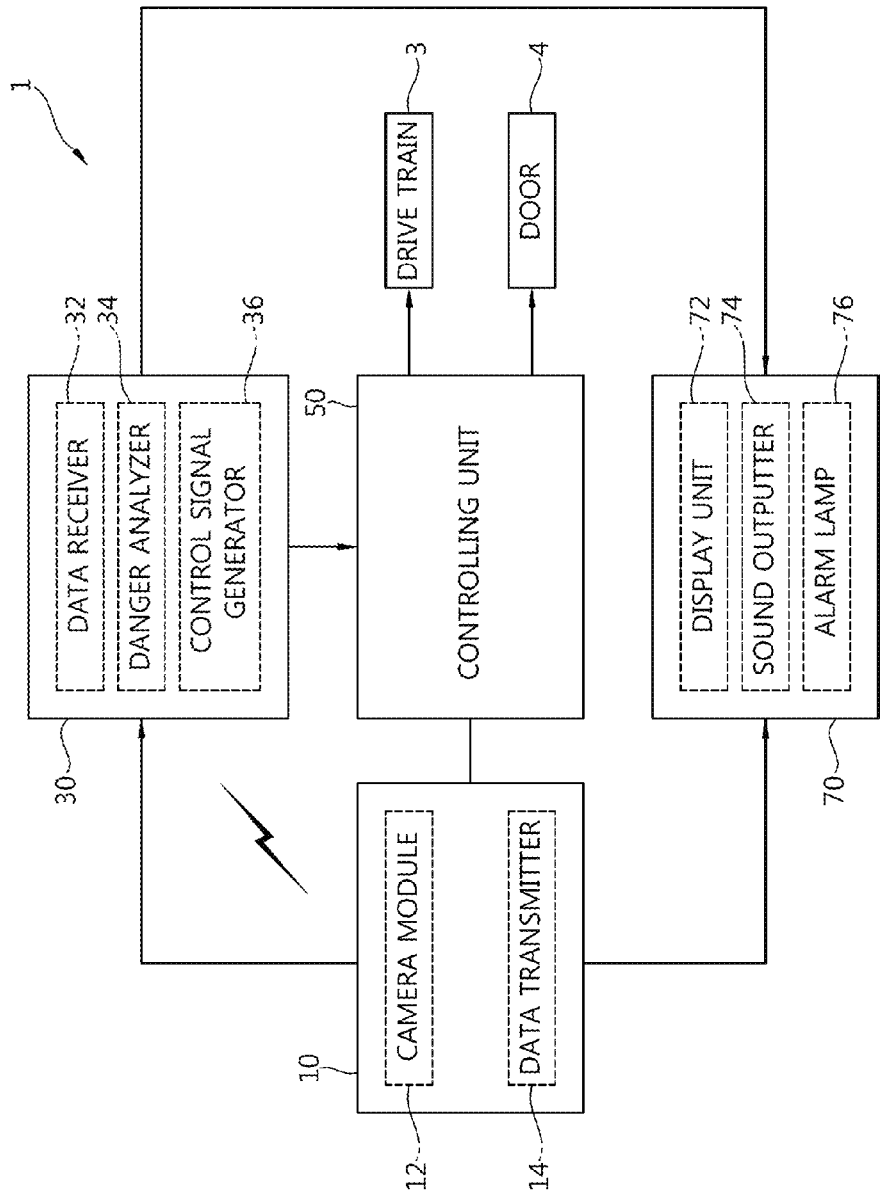
FIG. 2 is a control block diagram of the danger sensing apparatus of the vehicle according to the exemplary embodiment of the present invention.

FIG. 1 is a configuration diagram showing an application of a danger sensing apparatus of a vehicle according to an exemplary embodiment of the present invention; and FIG. 2 is a control block diagram of the danger sensing apparatus of the vehicle according to the exemplary embodiment of the present invention.

As shown in FIGS. 1 and 2, a danger sensing apparatus 1 of a vehicle 2 according to an exemplary embodiment of the present invention is configured to include a data collecting unit 10, a data analyzing unit 30, a controlling unit 50, and a data outputting unit 70. The danger sensing apparatus 1 of the vehicle 2 collects and analyzes images of a side of the vehicle 2 and a door 4 region opening/closing an entrance through which passengers 6 get on/off the vehicle and controls a drive train 3 of the vehicle 2 and the door 4.

The data collecting unit 10 includes a camera module 12 and a data transmitter 14. The data collecting unit 10 collects the side of the vehicle 2 and a situation of the door 4 region at which the passengers 6 get on/off the vehicle as data.

The camera module 12 is disposed at a side rear-view mirror of the vehicle 2 and the door 4 region of a passenger entrance. The camera module 12 is mounted on the side rear-view mirror in a direction toward the entrance through which the passengers 6 get on/off the vehicle 2 when the vehicle 2 stops and is disposed at the door 4 region at which the passenger 6 get on/off. As described above, the camera module 12 is disposed at the side rear-view mirror and the door 4 region of the entrance to photograph a danger object 5 approaching the side of the vehicle 2, a situation in which the passengers 6 get on/off the vehicle 2 through the entrance, interpositions of foreign materials at the time of opening/closing of the door 4 after the passengers 6 get on/off the vehicle 2, and the like.

The data transmitter 14 transmits image data photographed and collected by the camera module 12 to the data analyzing unit 30. The data transmitter 14 uses at least one of a wired communication scheme and a wireless data transmission scheme in order to communicate with a data receiver 32 of the data analyzing unit 30 to be described below. According to the exemplary embodiment of the present invention, the data transmitter 14 uses both of the wired communication scheme and the wireless data transmission scheme.

Meanwhile, the data transmitter 14 may transmit the image data photographed in the camera module 12 to a display unit 72 of the data outputting unit 70 to be described below in real time. As described above, the image data transmitted from the data transmitter 14 in real time are displayed on the display unit 72 so that a driver of the vehicle 2 may recognize a real time situation.

The data analyzing unit 30 according to the exemplary embodiment of the present invention includes the data receiver 32, a danger analyzer 34, and a control signal generator 36. The data analyzing unit 30 analyzes the image data transmitted from the data collecting unit 10 in real time to analyze a danger situation capable of being generated for the passenger 6 getting on/off the vehicle 2 and generates a control signal in the case in which it is analyzed that the danger situation is generated.

The data receiver 32 receives the image data transmitted from the data transmitter 14 of the data collecting unit 10 in the wired communication scheme and the wireless data transmission scheme.

The danger analyzer 34 analyzes the image data received in the data receiver 32. The danger analyzer 34 recognizes and analyzes an object corresponding to the danger situation of the passenger 6 when the vehicle 2 stops.

First, the danger analyzer 34 analyzes and determines whether the danger object 5 approaching the side of the vehicle 2 is present from the image data collected from the camera module 12 mounted on the side rear-view mirror. The danger analyzer 34 analyzes and determines whether the danger object 5 is a two-wheeled vehicle such as a motorcycle or a bicycle when it is analyzed that the danger object 5 is present. Further, the danger analyzer 34 analyzes a speed at which the two-wheeled vehicle approaches the entrance of the vehicle 2 in the case in which the danger object 2 is the two-wheeled vehicle such as the motorcycle or the bicycle.

Second, the danger analyzer 34 analyzes and determines a situation in which the passengers 6 get on/off the vehicle 2 from the image data collected from the camera module 12 mounted on the door 4 region when the vehicle 2 stops.

Third, the danger analyzer 34 analyzes whether the passengers 6, the foreign materials, and the like, are interposed between the entrance and the door 4 from the image data collected from the camera module 12 mounted on the door 4 region before the vehicle 2 starts to be driven from a state in which the vehicle 2 stops.

The first to third analyses of the danger analyzer 34 as described above may be sequentially performed. For example, the danger analyzer 34 analyzes the danger situation of the danger object 5 approaching the side of the vehicle 2, analyzes the situation in which the passengers 6 get on/off the vehicle 2 in the case in which it is not determined that the analyzed data corresponds to the danger situation, and analyzes whether the passengers 6 and the foreign materials are interposed in a state in which the door 4 is closed before the vehicle 2 starts to be driven in the case in which it is not determined that the analyzed data corresponds to the danger situation (a process in which the passengers get on/off the vehicle 2).

The control signal generator 36 generates the control signal according to the analysis and the determination of the danger analyzer 34. That is, the control signal generator 36 generates a control signal allowing the controlling unit 50 to control an operation of the drive train 3 of the vehicle 2 and the door 4 when it is determined that the data analyzed from the danger analyzer 34 corresponds to the danger situation.

The control signal generator 36 generates a control signal allowing the door 4 to be maintained in a closed state at the time of a danger situation of the side of the vehicle 2 and generates a control signal allowing the door 4 to be maintained in an opened state when the passengers 6 get on/off the vehicle 2. In addition, the control signal generator 36 generates a control signal allowing the door 4 to be opened when the passengers 6 or the foreign materials are interposed in a state in which the door 4 is closed after it is determined that a process in which the passengers 6 get on/off the vehicle 2 is completed.

Here, the control signal generated from the control signal generator 36 is preferential to a manual operation of the driver of the vehicle 2. For example, when it is determined that the analyzed data corresponds to the danger situation after the vehicle 2 stops, the control signal is preferentially operated as compared to an operation of the door 4. In addition, when it is determined that the analyzed data corresponds to the danger situation before the vehicle 2 starts to be driven, the control signal is preferentially operated as compared to an operation of the door 4 and an operation of the drive train 3 of the vehicle 2.

The controlling unit 50 controls the operations of the drive train 3 of the vehicle 2 and the door 4 based on the signal generated from the control signal generator 36. That is, the controlling unit 50 controls at least any one of the operations of the drive train 3 of the vehicle 2 and the door 4 according to the danger situation of the data analyzed from the danger analyzer 34.

For example, at the time of the stop of the vehicle 2, the controlling unit 50 receives the control signal provided from the control signal generator 36 to control the operation of the door 4 so that the door 4 is not opened, when it is determined that the data analyzed from the danger analyzer 34 corresponds to the danger situation in which the danger object 5 approaches the vehicle 2. In addition, the controlling unit 50 receives the control signal provided from the control signal generator 36 to control the operation of the door 4 so that the door 4 is maintained in the closed state when it is determined that the data analyzed from the danger analyzer 34 corresponds to the situation in which the passengers 6 get on/off the vehicle 2 through the entrance. Further, before the vehicle 2 starts to be driven, the controlling unit 50 receives the control signal to preferentially control the drive train 3 of the vehicle 2 so that the vehicle 2 is not driven and control the operation of the door 4 so that the passengers 6 or the foreign materials interposed between the entrance and the door 4 may be removed, when it is determined that the data analyzed from the danger analyzer 34 corresponds to the situation in which the passengers 6 or the foreign materials are interposed between the entrance and the door 4.

Finally, the data outputting unit 70 includes the display unit 72, a sound outputter 74, and an alarm lamp 76. Preferentially, the data outputting unit 70 outputs the image data collected from the camera module 12 of the data collecting unit 10 in real time. In addition, the data outputting unit 70 outputs an alarm so as to warn the driver of the vehicle 2 and the passengers 6 of the danger situation in the case in which it is determined that the data analyzed from the data analyzing unit 30 corresponds to the danger situation. Here, the alarm may include an alarm message, an alarm sound, and the like.

The display unit 72 displays the image data collected from the camera module 12 of the data collecting unit 10 in real time. In addition, the display unit 72 displays the alarm message in the case in which the data analyzed from the data analyzing unit 30 corresponds to the danger situation. Here, the display unit 72 may inform the driver and the passenger of the alarm through flicker of a screen in addition to the alarm message.

The sound outputter 74 outputs the alarm sound in the case in which the data analyzed from the data analyzing unit 30 corresponds to the danger situation. According to the exemplary embodiment of the present invention, a speaker capable of outputting the alarm sound is used as the sound outputter 74.

The alarm lamp 76 uses light in order to inform the driver and the passenger of the alarm in the case in which the data analyzed from the data analyzing unit 30 corresponds to the danger situation. For example, the alarm lamp 76 may be a warning light installed in a police car or a fire engine.

As described above, the data outputting unit 70 outputs the image data collected from the camera module 12 in real time so that the driver of the vehicle 2 may be informed of the side of the vehicle 2 and the situation of the door 4 region in real time. In addition, the data outputting unit 70 outputs the alarm to the driver of the vehicle 2 and the passengers 6 so as to prevent an accident in the case in which the data analyzed from the data analyzing unit 30 corresponds to the danger situation.

Figure 3:
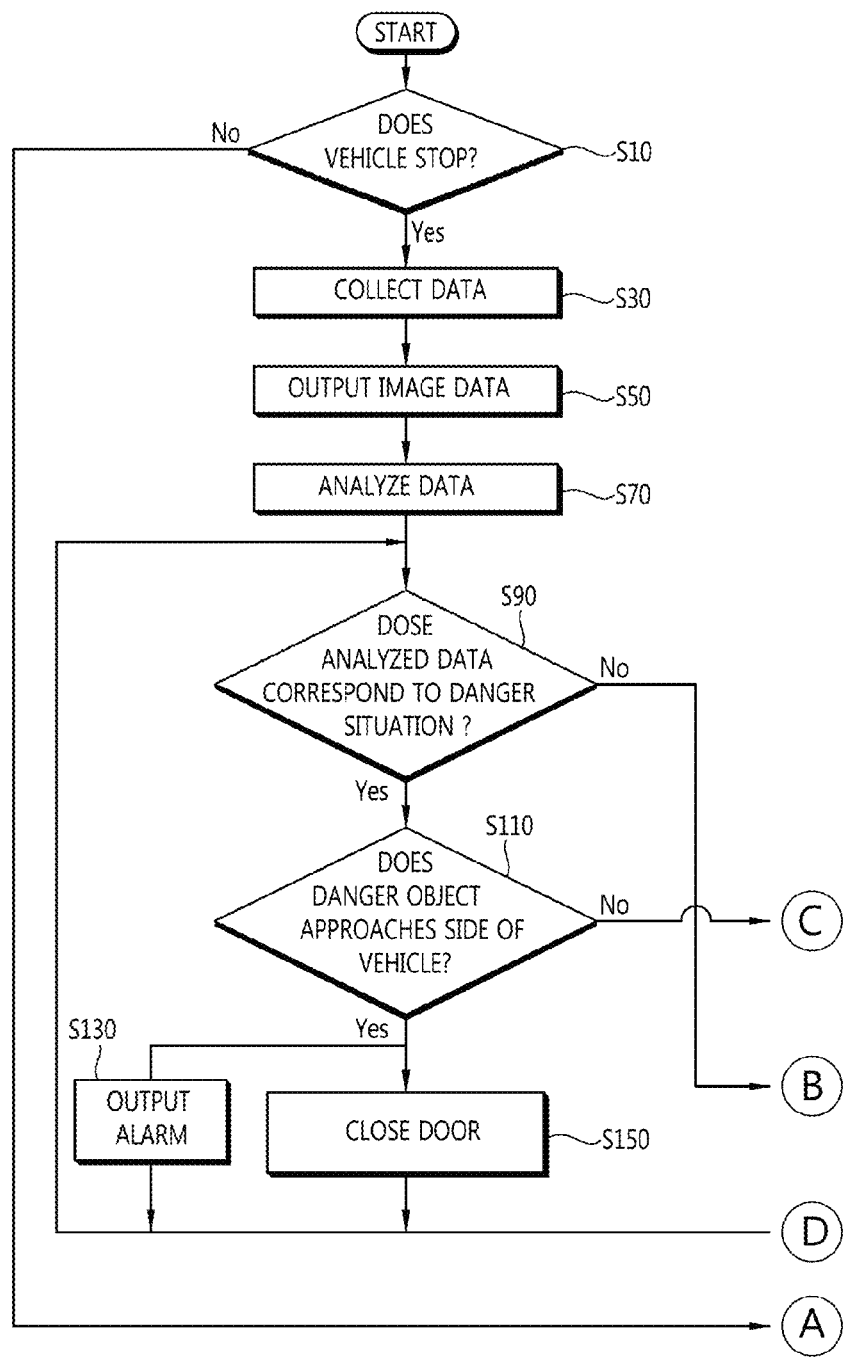
FIGS. 3 and 4 are control flow charts of the danger sensing apparatus of the vehicle according to the exemplary embodiment of the present invention.
Figure 4:
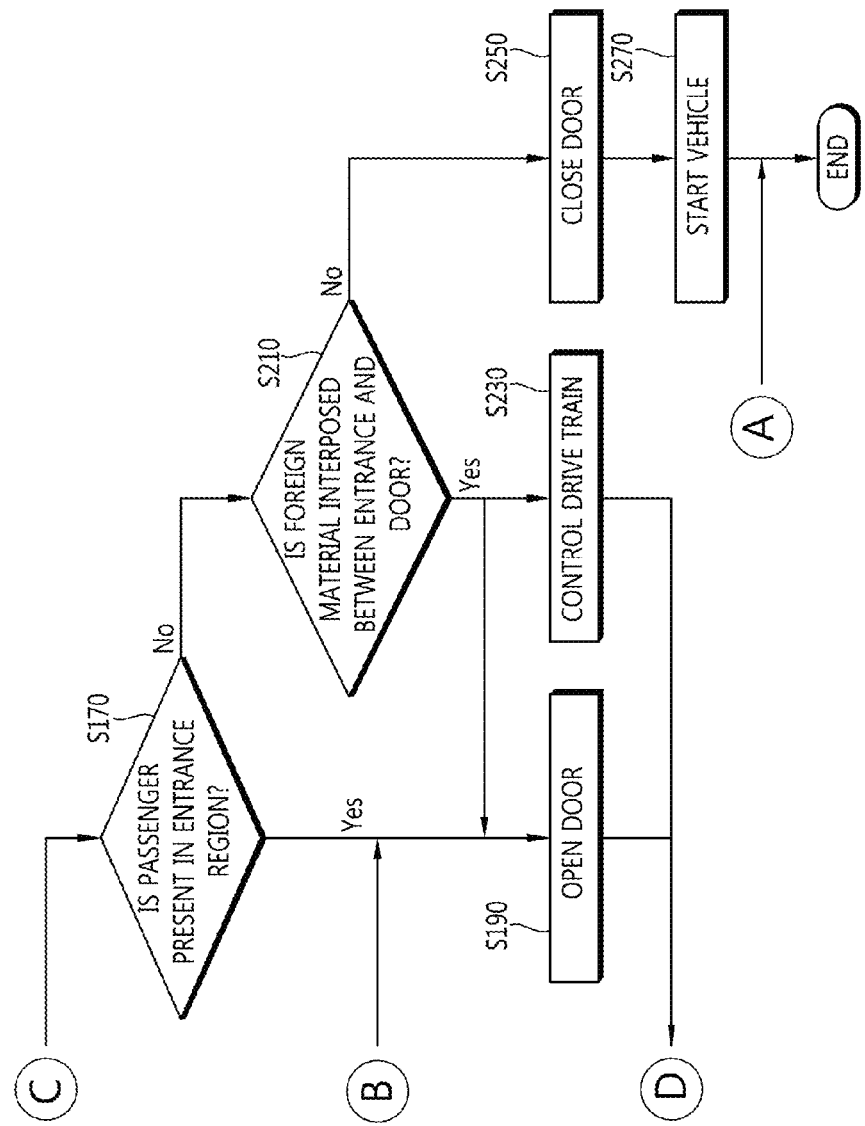

FIGS. 3 and 4 are control flow charts of the danger sensing apparatus of the vehicle according to the exemplary embodiment of the present invention.

A control method of a danger sensing apparatus 1 of a vehicle 2 according to an exemplary embodiment of the present invention will be described with reference to a configuration shown in FIGS. 3 and 4.

First, it is determined whether the vehicle 2 stops (S10). In the case in which it is determined that the vehicle 2 stops, the camera module 12 of the data collecting unit 10 collects the image data on the side of the vehicle 2 and the situation of the door 4 region opening/closing the entrance (S30). Meanwhile, when it is determined in step (S10) that the vehicle is being driven, the driving of the vehicle 2 is continuously performed while an operation of the camera module 12 as in a control flow to a process 'A'.

In step (S30), the camera module 12 collects the image data in real time until the vehicle starts to be driven. In addition, the display unit 72 of the data outputting unit 70 displays the image data transmitted in real time (S50).

Next, the data analyzing unit 30 receives the image data transmitted from the data collecting unit 10 to analyze the danger situation of the image data (S70).

It is determined whether the data analyzed in step (S70) corresponds to the danger situation (S90). When it is determined in step (S90) that the analyzed data corresponds to the danger situation, it is determined whether the danger object 5 such as the motorcycle, the bicycle, or the like, approaches the side of the vehicle 2 (S110). On the other hand, when it is not determined in step (S90) that the analyzed data corresponds to the danger situation, the door 4 is open so that the passengers 6 get off the vehicle according to a control flow of 'B' (S190).

When it is determined in step (S110) that the danger target 5 is present at the side of the vehicle 2 and approaches the side of the vehicle 2, an alarm is output so as to inform the driver of the vehicle 2 and the passengers 6 getting on the vehicle 2 of the danger situation (S130). Here, the output alarm may be an alarm message displayed on the display unit 72, an alarm sound output from the sound outputter 74, and a light emitted from the alarm lamp 76. In addition, together with step (S130), the door 4 is closed so that the passengers 6 getting on the vehicle 2 do not get off the vehicle 2 (S150).

Meanwhile, it is determined in step (S110) that the danger object 5 is not present at the side of the vehicle 2, it is determined whether the passengers 6 are present in an entrance region according to a control flow of 'C' (S170) When it is determined in step (S170) that the passengers are present in the entrance region, the door 4 is opened (S190).

Next, when it is determined in step (S170) that the passengers 6 are not present in the entrance region, it is determined whether the passengers 6 or the foreign materials are interposed between the entrance and the door 4 at the time of closure of the door 4 (S210). When it is determined in step (S210) that the passengers 6 or the foreign materials are interposed between the entrance and the door 4 of the entrance region, the door 4 is opened (S190). In addition, when it is determined in step (S210) that the passengers 6 or the foreign materials are interposed between the entrance and the door 4 of the entrance region, the drive train 3 is controlled so that the vehicle 2 is not driven (S230).

On the other hand, when it is determined in step (S210) that the passengers 6 or the foreign materials are not interposed between the entrance and the door 4 of the entrance region, the door 4 is closed (S250). Then, the vehicle 2 starts so that it is driven (S270).

Here, from after the stop of the vehicle 2 to before the start of the driving thereof, steps (S90 to S230) are repeatedly performed according to the image data collected from the data collecting unit 10 in real time and the analysis of the collected image data as in a control flow of 'D'.

As set forth above, with the danger sensing apparatus of the vehicle and the control method thereof according to the exemplary embodiments of the present invention, the side of the vehicle and the situation of the door region when the passengers get on/off the vehicle at the time of the stop of the vehicle are collected and analyzed in real time, thereby making it possible to actively control the operations of the drive train of the vehicle and the door. Therefore, the accident capable of being generated when the passengers get on/off the vehicle may be prevented in advance.

Although the exemplary embodiments of the present invention has been described with reference to the accompanying drawings, those skilled in the art will appreciate that various modifications and alterations may be made without departing from the spirit or essential feature of the present invention. Therefore, it should be understood that the above-mentioned embodiments are not restrictive, but are exemplary in all aspects. It should be interpreted that the scope of the present invention is defined by the following claims rather than the above-mentioned detailed description and all modifications or alterations deduced from the meaning, the scope, and equivalences of the claims are included in the scope of the present invention.

What is claimed is:

1. A danger sensing apparatus of a vehicle, comprising:
   a data collecting unit disposed at each of a side rear-view mirror of the vehicle and an inner portion of the vehicle to collect image data of a side region of the vehicle and a situation of a door region of the inner portion of the vehicle as data;
   a data analyzing unit analyzing the data collected from the data collecting unit to analyze a danger object approaching an outer side of the vehicle and the situation of the door region of the inner portion of the vehicle; and
   a controlling unit controlling operations of a drive train of the vehicle and closing a door in the door region based on a signal analyzed from the data analyzing unit.

2. The danger sensing apparatus of claim 1, further comprising a data outputting unit outputting an alarm according to a danger situation based on the data collected from the data collecting unit and the data analyzed from the data analyzing unit.

3. The danger sensing apparatus of claim 2, wherein the data outputting unit includes:
   a display unit displaying an alarm message according to the danger situation based on the data collected from the data collecting unit and the data analyzed from the data analyzing unit; and
   a sound outputter outputting an alert sound according to the danger situation based on the data analyzed from the data analyzing unit.

4. The danger sensing apparatus of claim 1, wherein the data collecting unit includes:
   a camera module disposed at the side rear-view mirror and the inner portion of the vehicle to collect the outer side of the vehicle and the situation of the door region of the inner portion of the vehicle as image data; and a data transmitter transmitting the image data collected from the camera module to the data analyzing unit.

5. The danger sensing apparatus of claim 4, wherein the data transmitter transmits the collected image data to the data analyzing unit in at least one of wired and wireless schemes.

6. The danger sensing apparatus of claim 5, wherein the situation of the door region includes a state indicating whether or not a passenger getting on/off the vehicle through the door is present and whether or not an object interposed between an entrance of the vehicle and the door is present.

7. The danger sensing apparatus of claim 6, wherein the danger analyzer analyzes the state indicating whether or not the passenger getting on/off the vehicle through the door is present and whether or not the object interposed between the entrance and the door is present in the image data received in the data receiver.

8. The danger sensing apparatus of claim 1, wherein the data analyzing unit includes:
    a data receiver receiving the data transmitted from the data collecting unit;
    a danger analyzer analyzing the data received in the data receiver to analyze the danger object approaching the side of the vehicle and the situation of the door region; and
    a control signal generator generating a control signal based on data analyzed from the danger analyzer.

9. The danger sensing apparatus of claim 8, wherein the danger object includes a motorcycle and a bicycle approaching the outer side of the vehicle.

10. The danger sensing apparatus of claim 9, wherein the danger analyzer analyzes whether or not the danger object is present and a speed at which the danger object approaches the side of the vehicle, in the data received in the data receiver.

11. The danger sensing apparatus of claim 8, wherein the controlling unit controls the operations of the drive train of the vehicle and the door based on the control signal generated from the control signal generator in the case in which it is determined that the data analyzed from the danger analyzer corresponds to the danger situation, at the time of stop of the vehicle.

12. A control method of danger sensing of a vehicle, comprising:
    (a) determining whether the vehicle stops;
    (b) collecting image data on an outer side of the vehicle and a door region of an inner portion of the vehicle in the case in which it is determined in step (a) that the vehicle stops;
    (c) analyzing whether or not a danger object approaching the outer side of the vehicle is present and a situation of the door region of the inner portion of the vehicle in the image data collected in step (b) to determine whether a danger situation is generated; and
    (d) controlling operations of a drive train of the vehicle and closing a door in the door region based on a signal analyzed in step (c).

13. The control method of claim 12, further comprising, between steps (b) and (c), outputting the collected image data.

14. The control method of claim 12, further comprising, between steps (c) and (d), outputting at least any one of an alarm message and an alarm sound in the case in which it is determined in step (c) that the danger situation is generated.

15. The control method of claim 12, wherein step (b) includes:
    photographing the side of the vehicle and the situation of the door region of the inner portion of the vehicle; and
    transmitting the image data photographed in the photographing.

16. The control method of claim 15, wherein the transmitting of the image data photographed in the photographing is performed in at least one of wired and wireless schemes.

17. The control method of any one of claim 12, wherein step (c) includes:
    receiving the image data transmitted in the transmitting;
    analyzing whether or not the danger object approaching the side of the vehicle is present and the situation of the door region of the inner portion of the vehicle from the received image data to determine whether the danger situation is generated; and
    generating a control signal in the case in which it is determined than the danger situation is generated.

18. The control method of claim 17, wherein in the determining of whether the danger situation is generated, whether or not the danger object approaching the side of the vehicle is present and a speed at which the danger object approaches the side of the vehicle are analyzed, before the door is opened.

19. The control method of claim 17, wherein in the determining of whether the danger situation is generated, an entrance situation of a passenger getting on/off the vehicle through the door is analyzed.

20. The control method of claim 19, wherein in the determining of whether the danger situation is generated, whether or not foreign materials are present between the door and the vehicle is analyzed, after the door is closed.

* * * * *